United States Patent
Hitosi

(10) Patent No.: US 6,215,832 B1
(45) Date of Patent: Apr. 10, 2001

(54) MAXIMUM LIKELIHOOD SEQUENCE ESTIMATION RECEIVER AND METHOD OF RECEIVING MAXIMUM-LIKELIHOOD SEQUENCE ESTIMATES

(75) Inventor: Matui Hitosi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,903

(22) Filed: Jun. 12, 1998

(30) Foreign Application Priority Data

Jun. 16, 1997 (JP) .................................................. 9-158173

(51) Int. Cl.$^7$ ...................................................... H03D 1/00
(52) U.S. Cl. ............................................ 375/341; 714/794
(58) Field of Search ..................................... 375/262, 265, 375/316, 340, 341, 358; 714/794, 795, 796, 797, 791; 329/319, 349

(56) References Cited

U.S. PATENT DOCUMENTS

| | | | |
|---|---|---|---|
| 5,684,832 | * 11/1997 | Adachi et al. .................. | 375/262 |
| 5,809,065 | * 9/1998 | Dapper et al. .................. | 375/216 |
| 5,835,541 | * 11/1998 | Namekata et al. .............. | 375/355 |
| 5,844,946 | * 12/1998 | Nagayasu ......................... | 375/341 |

FOREIGN PATENT DOCUMENTS 5-292139    11/1993   (JP) .

* cited by examiner

Primary Examiner—Chi Pham
Assistant Examiner—Emmanuel Bayard
(74) Attorney, Agent, or Firm—Ostrolenk, Faber, Gerb & Soffen, LLP

(57) ABSTRACT

A maximum likelihood sequence estimation receiver includes a transmission line characteristic detector that detects a transmission line characteristic based on a received input signal when a training signal is received through the input terminal, an absolute value arithmetic section that performs arithmetic on absolute values of amplitude components based on the transmission line characteristic, an accumulator that accumulates the absolute values of the resultant amplitude components, a maximum value detector that detects a timing at which the cumulative output signal indicates a maximum value, and a maximum likelihood sequence estimator that performs a maximum-likelihood estimation of a received input signal using the transmission line characteristic from the transmission line detector and the timing signal output from the maximum value detector and then outputs maximum likelihood estimation data through the output terminal. This receiver can certainly and accurately judge the optimum estimation region by transmission line impulse responses using a simple algorithm, thus easily realizing its low power consumption and its simplified circuit configuration.

12 Claims, 6 Drawing Sheets

OPTIMUM ESTIMATION REGION

MAXIMUM LIKELIHOOD SEQUENCE ESTIMATION RECEIVER AND METHOD OF RECEIVING MAXIMUM-LIKELIHOOD SEQUENCE ESTIMATES

BACKGROUND OF THE INVENTION

The present invention relates to a maximum likelihood sequence estimation receiver that estimates a transmission signal from a signal with transmission distortion due to a frequency-selective fading in multiple radio propagation (multipath) such as a radio line in a high-speed digital communications system, for example, a digital mobile telephone system. More particularly, the present invention relates to a maximum likelihood sequence estimation receiver that obtains estimates of transmission signals by selecting an optimum portion among impulse response sequences with transmission distortion. Moreover, the present invention relates to a method of receiving maximum-likelihood sequence estimates.

An example of the technique in which that type of signal estimation is performed by selecting the optimum portion among impulse response sequences with transmission distortion is disclosed in, for example, JP-A-292139/1993 titled as "maximum likelihood sequence estimation receiver".

FIG. 4 is a block diagram illustrating the configuration of a conventional maximum likelihood sequence estimation receiver. In FIG. 4, each of tap coefficients of the matched filter 22 is added based on impulse responses of a received input signal from the transmission line. In this case, the number of taps of the matched filter 22 has to be minimized to reduce the throughput of the status estimator 23 with the largest arithmetic amount. A reduced number of taps allows only a limited region of impulse response sequences to be processed.

Hence, it is needed to judge whether or not what region of impulse response sequences to be processed with a tap coefficient provides the highest estimation capability. The receiver shown in FIG. 4 implements an estimation region judgment according to the following steps. FIG. 5 is a diagram explaining impulse response values.

Referring to FIGS. 4 and 5, upon receiving a training signal from the transmission side, the signal generator 26 generates the same signal as the training signal. The estimator 25 determines characteristic-line impulse response values. When impulse response values are obtained as shown in FIG. 5, the position estimator 27 compares the amplitudes of the impulse response values. This comparison operation numbers the impulse response values in decreasing order. The region where the sum of pulse numbers is smallest among regions containing a pulse with the maximum amplitude is regarded as an optimum signal estimation region. The timing signal representing the optimum signal estimation region is sent to the matched filter 22 and the status estimator 23 to implement the optimum maximum likelihood sequence estimation.

However, the above-mentioned prior art requires to implement a complicated algorithmic operation to determine the optimum estimation region. That is, amplitude values, as shown in FIG. 5, need to be numbered in decreasing order. Moreover, the comparison operation must be repeated several times to determine the optimum estimation region by performing arithmetic to compare impulse response values. This results in making the whole algorithm complicated. Particularly, as the number of taps of the matched filter increases, the arithmetic operations to be processed increases.

The optimum estimation region judgment cannot always obtain an optimum estimation region because impulse responses necessarily contain a maximum value pulse.

FIG. 6 is a diagram explaining the status where impulses response values are numbered in a decreasing order of amplitude value in a transmission line. In order to estimate a signal with distortion in a transmission line with impulse responses as shown in FIG. 6, the pulses 2, 3, and 4 must be selected as optimum estimation regions. In this case, since the pulse 1 with the maximum value is necessarily selected, the optimum estimation region cannot be specified.

SUMMARY OF THE INVENTION

The present invention is made to solve the above-mentioned problems. The objective of the present invention is to provide a maximum likelihood sequence estimation receiver that can certainly and accurately find optimum estimation regions with a simple algorithm, instead of the use of the power arithmetic scheme which requires a large operation capability, when regions which enable optimum signal estimation are determined from transmission line impulse responses.

Another objective of the present invention is to provide a maximum sequence likelihood sequence estimation receiver that can easily realize its low power consumption and its simplified circuit configuration, thus resulting in compactness and lightweight thereof.

Still another objective of the present invention to a method of receiving maximum-likelihood sequence estimates.

The objective of the present invention is achieved by a maximum likelihood sequence estimation receiver that selects an optimum region among impulse response sequences with transmission line distortion to estimate a transmission signal among signals with transmission distortion, comprising decision means for substitutively implementing a power calculation within an estimation region by an absolute value operation and detecting a timing at which a cumulative value of absolute values in said estimation region is maximized and thus deciding an optimum estimation region with a small amount of processes.

According to the present invention, the decision means comprises a transmission line characteristic detector for detecting a transmission line characteristic in a received signal, an absolute value arithmetic section for performing arithmetic on absolute values of amplitude components in the transmission line characteristic detected by the transmission line characteristic detector, an accumulator for accumulating the absolute values of the amplitude components from the absolute value arithmetic section and then outputting an output signal, a maximum value detector for detecting a timing at which the output signal of the accumulator indicates a maximum value, and a maximum likelihood sequence estimator for performing a maximum likelihood estimation of the received signal using the transmission line characteristic from the transmission line characteristic detector and the timing from the maximum value detector.

Moreover, according to the present invention, the absolute value arithmetic section comprises a first absolute value arithmetic section for determining a real part absolute value of a complex signal with a transmission characteristic, a second absolute value arithmetic section for determining an imaginary part absolute value of the complex signal with a transmission characteristic, a comparator for comparing the real part absolute value from the first absolute value arithmetic section with the imaginary part absolute value from the second absolute value arithmetic section and then outputting a comparison signal, a switching section for outputting said real part absolute value and the imaginary part absolute value without any change when said real part absolute value is larger than said imaginary part absolute value and reversely outputting said real part absolute value and the imaginary part absolute value when said real part absolute value is smaller than said imaginary part absolute value, a multiplier for outputting the imaginary part absolute value when the real part absolute value from the switching section is larger than the imaginary part absolute value from the switching section or decreasing the real part absolute value switched by the switching section when the real part absolute value from the switching section is smaller than the imaginary part absolute value from the switching section, and an adder for adding an output signal from the switching section and an output signal from the multiplier and then outputting a resultant signal as an absolute value signal.

Furthermore, according to the present invention, the maximum value detector comprises a first register for storing a maximum value among values of output signals from the accumulator, a comparator for comparing an input signal sent from the accumulator with an output signal from the first register, a switching section for receiving an input signal from the accumulator and an output signal from the first register, selectively outputting the input signal as a maximum value when the output signal from the comparator is larger than the input signal, and selecting the output signal from the first register when the input signal is smaller than the output signal from the first register, a counter for outputting a count value, and a second register for storing an output signal from the comparator, a count value of the counter, and a timing value and then outputting the values to the maximum sequence likelihood estimator.

According to the present invention, the transmission line distortion is a distortion due to frequency selective fading in multipath wave propagation over a radio line.

According to the present invention, the maximum likelihood sequence estimation receiver is applicable for a high-speed digital communications system.

According to the present invention, a method of receiving maximum-likelihood sequence estimates, comprises the steps of substitutively implementing a power calculation within estimation region by an absolute value operation; detecting a timing at which a cumulative value of absolute values in the estimation region is maximized; and deciding an optimum estimation region with a small amount of processes; wherein a transmission signal among signals with transmission distortion is estimated by selecting an optimum region among impulse response sequences with transmission distortion.

As described above, in the configuration of the present invention, a transmission signal is estimated from signals with transmission line distortion by selecting an optimum sequence among transmission signal impulse response sequences with a transmission distortion. The optimum estimation region is decided with a small amount of processes by substitutively implementing a power calculation within an estimation region by an absolute value operation and detecting a timing at which the cumulative value of absolute values in the estimation region is maximized.

In such a manner, an optimum signal estimation region can be certainly and accurately determined from transmission impulse responses with a simple algorithm, instead of the use of the power arithmetic scheme which requires a large operation capability.

As a result, the low power consumption and the simplified circuit configuration can be easily realized and the entire system can be configured in compactness and lightweight.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below in detail with reference to the attached drawings.

Figure 1:
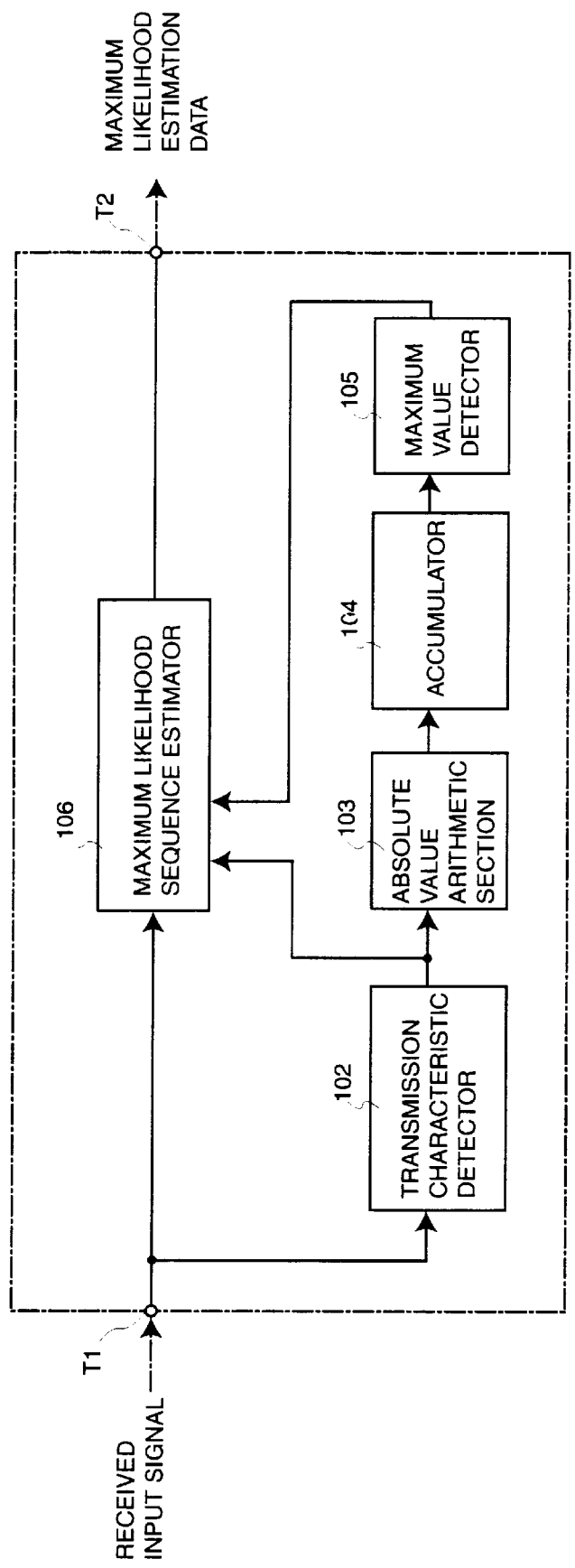
FIG. 1 is a block diagram illustrating a maximum likelihood sequence estimation receiver according to an embodiment of the present invention.

FIG. 1 is a block diagram showing a maximum likelihood sequence estimation receiver according to an embodiment of the present invention. Referring to FIG. 1, the maximum likelihood sequence estimation receiver consists of a transmission line characteristic detector 102 for detecting a transmission line characteristic based on a received input signal when a training signal is received through the terminal T1 and an absolute value arithmetic section 103 for performing arithmetic on the absolute value of an amplitude component based on the transmission line characteristic detected by the transmission line characteristic detector 102.

The maximum likelihood sequence estimation receiver also includes an accumulator 104 for accumulating the absolute values of amplitude components from the absolute value arithmetic section 103, a maximum value detector 105 for detecting a timing at which the output signal of the accumulator 104 indicates a maximum value, and a maximum likelihood sequence estimator 106 for performing a maximum-likelihood estimation of a received input signal using the transmission line characteristic from the transmission line detector 102 and the timing signal output from the maximum value detector 105 and then outputting maximum likelihood estimation data through the output terminal T2.

Figure 2:
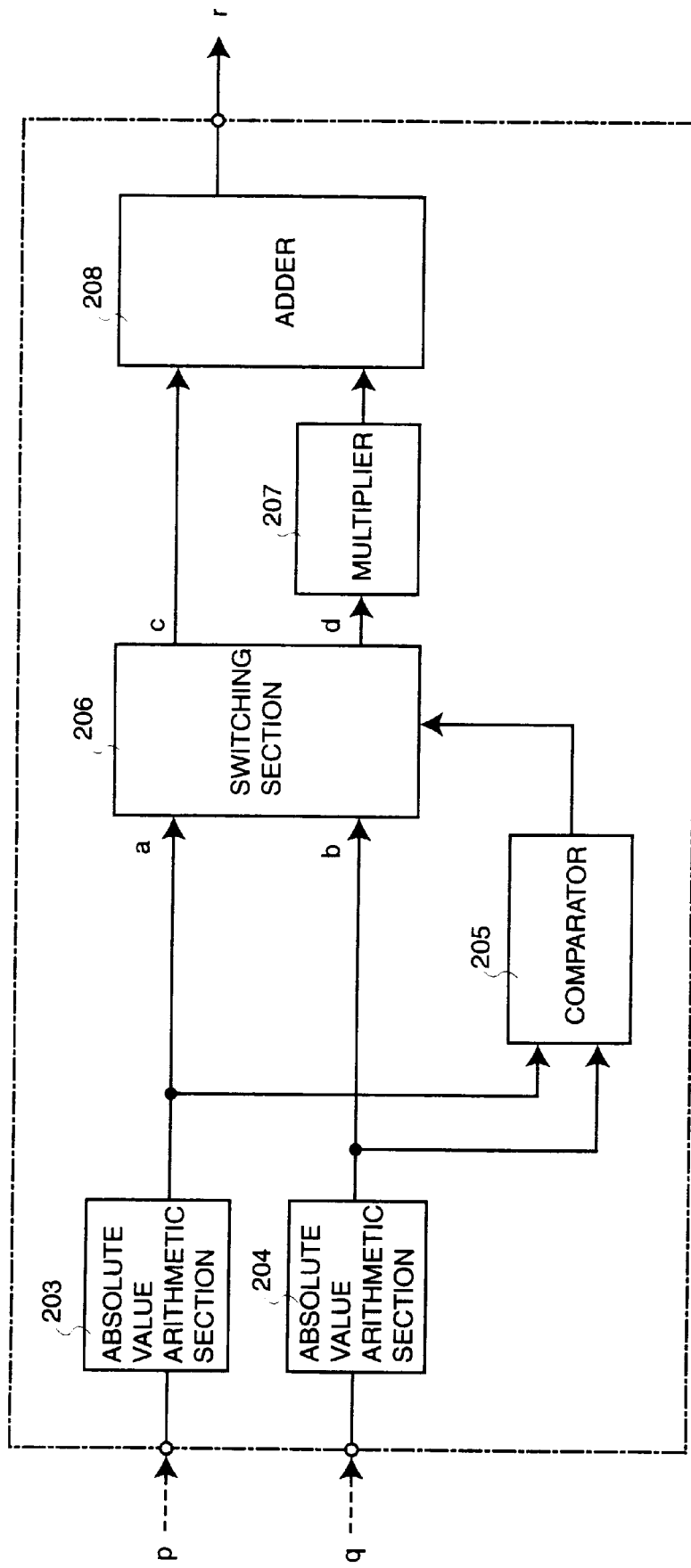
FIG. 2 is a block diagram illustrating a detailed configuration of the absolute value detector shown in FIG. 1.

FIG. 2 is a block diagram illustrating the detailed configuration of the absolute value arithmetic section 103. Referring to FIG. 2, the absolute arithmetic section 103 includes an absolute value arithmetic section 203 for obtaining the absolute value of a real part of a complex signal with transmission line characteristics (to be described later), an absolute value arithmetic section 204 for obtaining the absolute value of an imaginary part of a complex signal with transmission line characteristics (to be described later), and a comparator 205 comparing the absolute value of the real part from the absolute value arithmetic section 203 with the absolute value of the imaginary part from the absolute value arithmetic section 204 and then producing a comparison signal.

The absolute value arithmetic section 203 has a switching section 206. When the comparator 205 indicates that the absolute value of a real part is larger than the absolute value of an imaginary part, the switching section 206 passes the absolute value of the real part and the absolute value of the imaginary part without any change. When the absolute value of a real part is smaller than the absolute value of an imaginary part, the switching section 206 outputs the absolute value of the real part and the absolute value of the imaginary part in an interchange mode.

The absolute value arithmetic section 103 also includes a multiplier that halves either the absolute value of an imaginary part smaller than the absolute value of a real part or the absolute value of a real part interchanged by the switching section 206 when the absolute value of the real part is smaller than the absolute value of the imaginary part, and an adder 208 for adding the output signal of the switching section 206 with the output signal from the multiplier 207.

Figure 3:
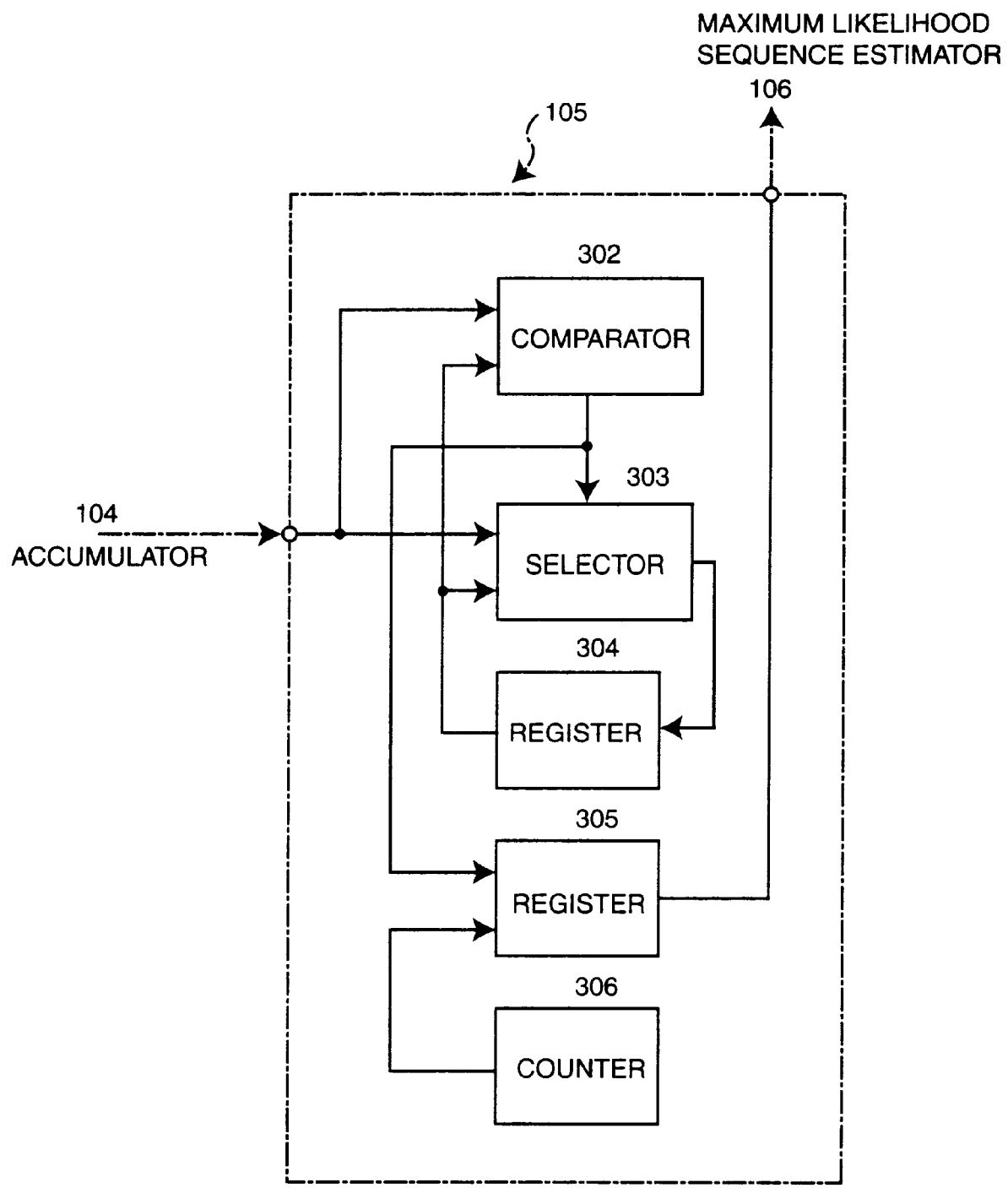
FIG. 3 is a block diagram illustrating a detailed configuration of the maximum value detector shown in FIG. 1.
Figure 4:
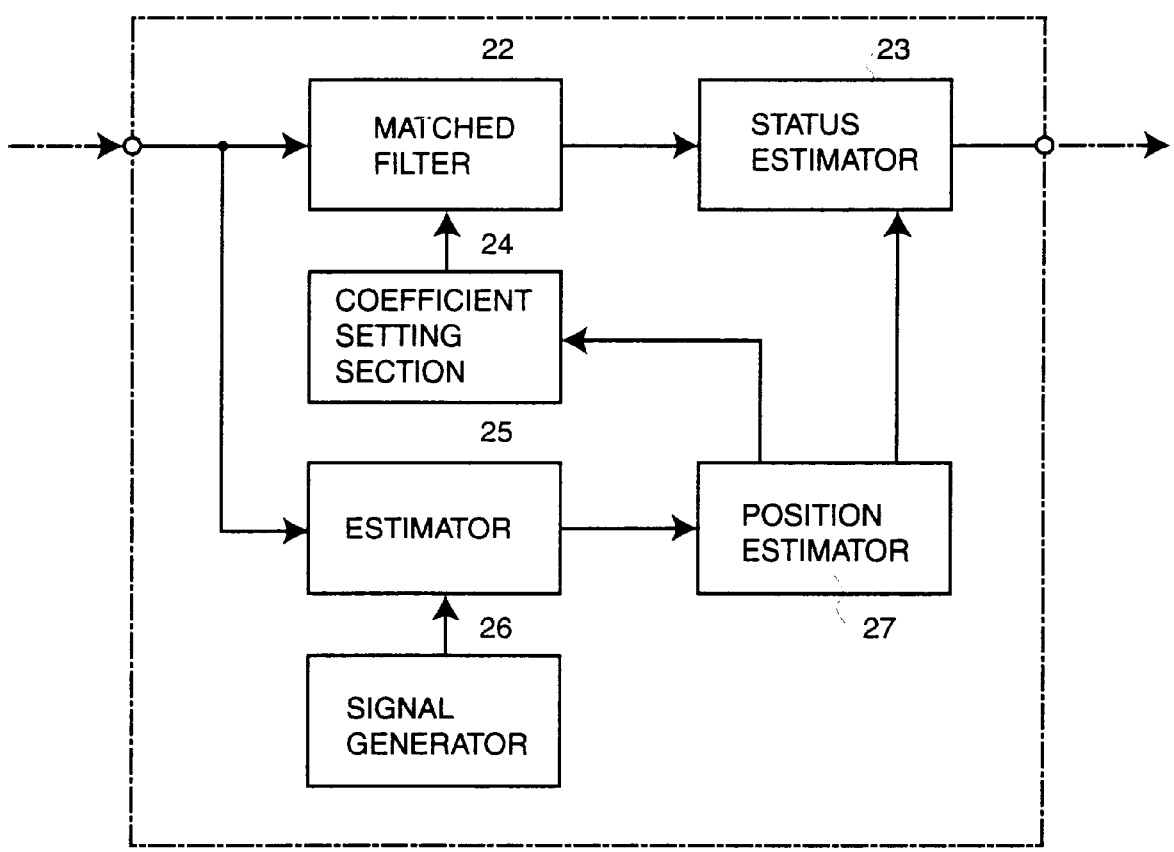
FIG. 4 is a block diagram illustrating a conventional maximum likelihood sequence estimation receiver.

FIG. 3 is a block diagram illustrating the detail configuration of the maximum value detector 105. Referring to FIG. 3, the maximum value detector 105 includes a register 304 for storing an output pulse with the maximum value among output pulses from the accumulator 104 and a comparator 302 for comparing an input signal from the accumulator 104 with an output signal from the register 304.

The absolute value detector 105 further has a selector 303, a counter 306, and a register 305. When receiving an input signal from the accumulator 104 and an output signal from the register 304, the selector 303 outputs the input signal as a maximum value when the input signal is larger than the output signal from the comparator 302 and outputs the output signal of the register 304 when the input signal is smaller than the output signal from the register 304. The counter 306 outputs a count value. The register 305 stores the output signal from the comparator 302, the count value of the counter 306, and timing values (to be described later) and then outputs them to the maximum likelihood sequence estimator 106.

The operation of the embodiment will be described in detail here.

Upon receiving a training signal, an received input signal is input to the transmission line characteristic detector 102 and the maximum likelihood sequence estimator 106 through the input terminal T1. The transmission line characteristic detector 102 detects transmission line characteristics and then inputs them to the absolute value arithmetic section 103 and the maximum likelihood sequence estimator 106. The absolute value arithmetic section 103 determines the absolute value of an amplitude component in a transmission line characteristic.

The accumulator 104 accumulates absolute values of amplitude components with the transmission line characteristic. The maximum value detector 105 detects a timing at which the output signal from the accumulator 104 indicates a maximum value. The maximum likelihood sequence estimator 106 subjects received input signals to maximum likelihood estimation using the transmission line characteristics from the transmission line characteristic detector 102 and the timing signals output from the maximum value detector 105.

In this operation, pseudo random number codes (PN codes) are used as a training signal. The transmission line characteristic detector 102 performs a correlation operation of the received training signal and PN codes to detect a transmission line impulse response. The absolute value arithmetic section 103 performs arithmetic on the absolute value of the impulse response to obtain the amplitude value thereof. The absolute values are accumulated by the accumulator 104. The number of cumulative absolutes is the same as the number of symbols in the impulse response region to be estimated by the maximum likelihood sequence estimator 106. The maximum value detector 105 sequentially captures absolute values by the number of symbols corresponding to one period of the PN code from the accumulator 104. Of the captured absolute values, the signal representing the timing at which an absolute value has the maximum value is output to the maximum likelihood sequence estimator 106.

Thus, the maximum likelihood sequence estimator 106 can judge whether or not impulse responses of the transmission line characteristic detector 102 as well as a specific one of impulse responses based on the output signal of the maximum value detector 105 are successfully used for an input signal estimation to provide the highest estimation capability.

The operation will be described in more detail below.

Figure 5:
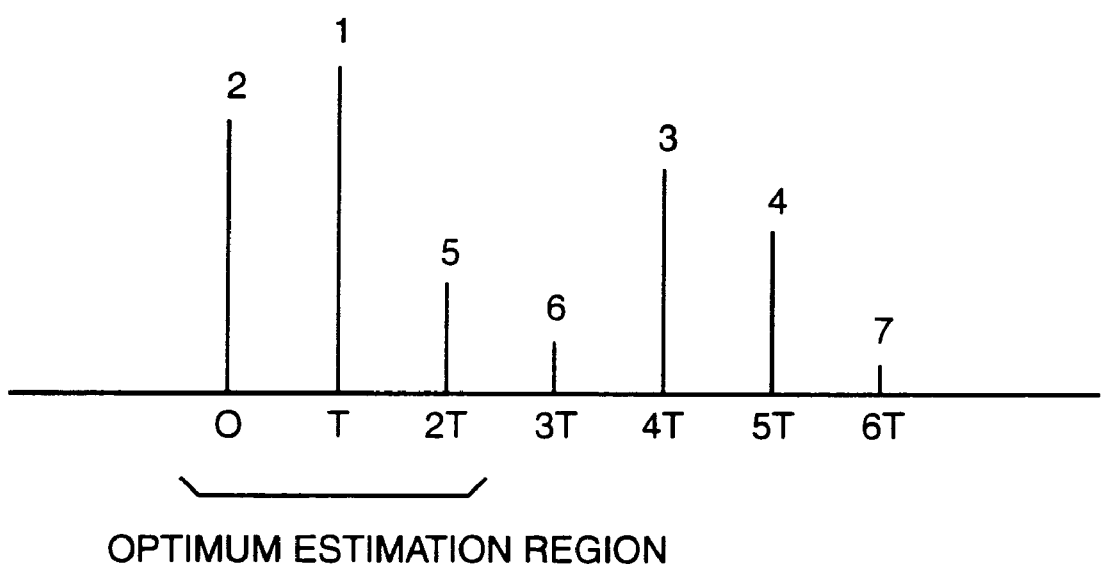
FIG. 5 is a diagram explaining impulse response values in a prior art.

Here, the impulse response of a transmission line indicates the same spectrum as that shown in FIG. 5. An M-sequence code of 31 bits is used as the PN code of the training signal. It is now assumed that signal estimation is performed using impulse responses for three symbols.

Referring again to FIG. 1, when a training signal is received, the transmission line characteristic detector 102 implements a correlation arithmetic operation of the received input signal and the 31 bit M-sequence PN code. In the correlation arithmetic operation, impulse responses for 31 symbols, as shown in FIG. 5, are output as a time-series signal. FIG. 5 shows the transmission characteristic represented by one-dimensional signal. In actual, the transmission line characteristic is represented by a complex signal.

The time-series signals of the impulse response is subjected to an approximate absolute value arithmetic operation by the absolute value arithmetic section 103. In the case of one-dimensional signal, the absolute value signal can be obtained through subtraction when the received input signal is negative. In the complex signal, the absolute value cannot be accurately obtained through only addition and subtraction procedures. In such a case, the absolute values of a complex signal are approximately obtained using the absolute value arithmetic section 10 shown in FIG. 2. When the absolute value of the real part p is larger than the absolute value of the imaginary part q, the absolute value r is calculated by the following formula (1):

$$r=abs(p)+abs(q)/2$$

(where p is a real part of a complex signal; q is an imaginary part of a complex signal; abs(p) is an absolute value; and abs(q) is an absolute value.)

When the absolute value of the real part p is smaller than the absolute value of the imaginary part q, the absolute value r is calculated by the following formula (2):

$$r=abs(p)/2+abs(q)$$

(where p is a real part of a complex signal; q is an imaginary part of a complex signal; abs(p) is an absolute value; and abs(q) is an absolute value.)

Referring to FIG. 2, the absolute value arithmetic section 203 obtains abs(p) whereas the absolute value arithmetic section 204 obtains abs(q). The comparator 205 compares the size of abs(p) from the size of abs(q) and then outputs the comparison result to the switching section 206. When abs(p)

is larger than abs(q), the switching section 206 connects the input terminal a to the output terminal c and the input terminal b to the output terminal d.

When abs(p) is smaller than abs(q), the comparator 205 connects the input terminal a to the output terminal d and the input terminal b to the output terminal c. The comparator 205 inputs a signal from its output terminal d to the multiplier 207 to halve the value thereof. The multiplier 207 can be realized by only a bit shift arithmetic operation. The adder 208 adds the signal from the output terminal c of the switching section 206 with the output signal of the multiplier 207 and then outputs the sum as an absolute value signal.

The accumulator 104 sequentially accumulates the output signals for three symbols from the absolute value arithmetic section 103 and then outputs the resultant cumulative value. In explanation with reference to FIG. 5, the accumulator 104 outputs the cumulative value of absolute values at the impulse response times of O, T, and 2T in a timing. In the next timing, the cumulative value of respective absolute values at the times T, 2T, and 3T are output.

In the next timing, the cumulative value of respective absolute values at the times 2T, 3T, and 4T are output. Thus, the accumulator 104 outputs 31 cumulative values corresponding to one period of the PN code. Using 31 cumulative values output from the accumulator 104, the maximum value detector 105 detects whether or not at what timing the impulse response has the maximum cumulative value.

In the maximum value detector 105 shown in FIG. 3, the register 304 receives 0 as an initial value. The counter 306 is set to 0 as an initial value. The comparator 302 compares the output signal from the register 304 with the size of the input symbol. When the input signal (the input symbol size) is larger than the output signal of the register 304, the selector 303 selects the input signal and inputs it as a maximum value to the register 304 while the counter 306 writes its count value to the register 305.

When the input signal is smaller than the output signal of the register 304, the selector 303 selects the output signal of the register 304 and holds it without any change. The register 305 does not write the output signal of the counter 306 and holds its status.

The arithmetic operation is repeated 31 times so that the register 304 stores the largest one among output values from the accumulator 104. The register 305 stores the timing value at that time. The timing value stored in the register 305 is output to the maximum likelihood sequence estimator 106. The maximum likelihood sequence estimator 106 receives impulse responses corresponding to 31 symbols from the transmission line characteristic detector 102, as shown in FIG. 5. The maximum value detector 105 receives the symbol representing the time O as a timing symbol so that the impulse response values at the times O, T and 2T are respectively used transmission line characteristics for signal estimation.

Figure 6:
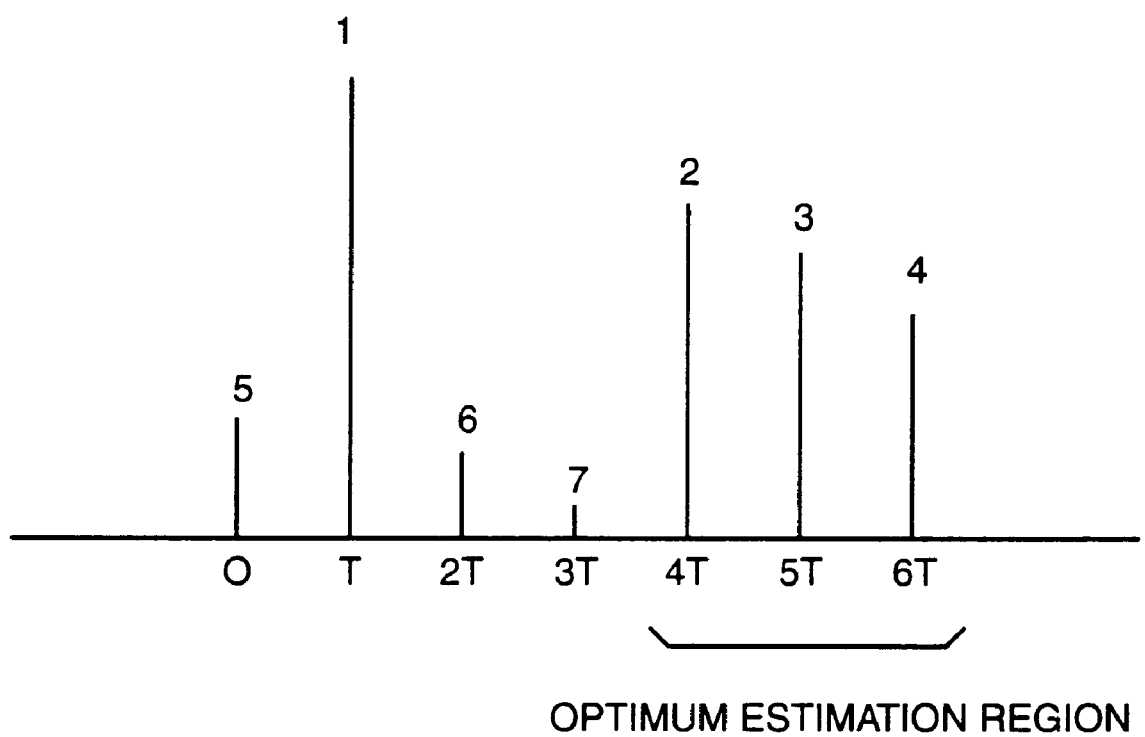
FIG. 6 is a diagram explaining impulse response values in a transmission line which are numbered in decreasing order of amplitude, in a prior art.

When the transmission line characteristic is the impulse responses shown in FIG. 6, the maximum value detector 105 outputs as a timing signal the signal representing the time 4T. Hence, the maximum likelihood sequence estimator 106 uses the impulse response values at the time 4T, 5T, and 6T.

In this embodiment, even when the maximum value of an impulse response is not in the region where the cumulative power is maximum as shown in FIG. 6, the region where the power component is maximum can be searched without being adversely affected by the maximum value thereof. In the embodiment, the approximate absolute value arithmetic section 103 shown in FIG. 3 is used to obtain estimation regions. However, an approximate arithmetic operation can be substitutively used to obtain the estimation region without any deterioration.

As described above, in order to implement a transmission signal estimation among signals with a transmission line distortion, the maximum likelihood sequence estimation receiver according to the present invention judges an optimum estimation region with a small number of operations by substitutively performing an absolute value arithmetic operation on power calculation within an estimation region and then detecting the timing at which the cumulative value of absolute values within the estimation region is maximized.

Hence, where the region where an optimum signal can be estimated is judged from transmission line impulse responses, the optimum estimation region can be certainly and accurately found with a simple algorism, without using the square arithmetic operating method which requires a large number of operations. This feature eases low power consumption and simplified circuit configuration, thus realizing a small, compact maximum likelihood sequence estimation receiver.

The entire disclosure of Japanese Patent Application No. 9-158173 filed on Jun. 16, 1997 including specification, claims, drawing and summary are incorporated herein by reference in its entirety.

What is claimed is:

1. A maximum likelihood sequence estimation receiver that selects an optimum region among impulse response sequences with transmission line distortion to estimate a transmission signal among signals with transmission distortion, comprising:

decision means for substitutively implementing a power calculation within an estimation region by an absolute value operation and detecting a timing at which a cumulative value of absolute values in said estimation region is maximized and thus deciding an optimum estimation region with a small amount of processes.

2. The maximum likelihood sequence estimation receiver defined in claim 1, wherein said decision means comprises:

a transmission line characteristic detector for detecting a transmission line characteristic in a received signal;

an absolute value arithmetic section for performing arithmetic on absolute values of amplitude components in the transmission line characteristic detected by said transmission line characteristic detector;

an accumulator for accumulating the absolute values of said amplitude components from said absolute value arithmetic section and then outputting an output signal;

a maximum value detector for detecting a timing at which the output signal of said accumulator indicates a maximum value; and a maximum likelihood sequence estimator for performing a maximum likelihood estimation of the received signal using the transmission line characteristic from said transmission line characteristic detector and the timing from said maximum value detector.

3. The maximum likelihood sequence estimation receiver defined in claim 2, wherein said absolute value arithmetic section comprises:

a first absolute value arithmetic section for determining a real part absolute value of a complex signal with a transmission characteristic;

a second absolute value arithmetic section for determining an imaginary part absolute value of the complex signal with a transmission characteristic;

a comparator for comparing the real part absolute value from said first absolute value arithmetic section with the imaginary part absolute value from said second absolute value arithmetic section and then outputting a comparison signal;

a switching section for outputting said real part absolute value and the imaginary part absolute value without any change when said real part absolute value is larger than said imaginary part absolute value and reversely outputting said real part absolute value and the imaginary part absolute value when said real part absolute value is smaller than said imaginary part absolute value;

a multiplier for outputting said imaginary part absolute value when said real part absolute value from said switching section is larger than said imaginary part absolute value from said switching section or decreasing said real part absolute value switched by said switching section when said real part absolute value from said switching section is smaller than said imaginary part absolute value from said switching section; and an adder for adding an output signal from said switching section and an output signal from said multiplier and then outputting a resultant signal as an absolute value signal.

4. The maximum likelihood sequence estimation receiver defined in claim 2, wherein said maximum value detector comprises:

a first register for storing a maximum value among values of output signals from said accumulator;

a comparator for comparing an input signal sent from said accumulator with an output signal from said first register;

a switching section for receiving an input signal from said accumulator and an output signal from said first register, selectively outputting the input signal as a maximum value when the output signal from said comparator is larger than the input signal, and selecting the output signal from said first register when the input signal is smaller than the output signal from said first register;

a counter for outputting a count value; and a second register for storing an output signal from said comparator, a count value of said counter, and a timing value and then outputting the values to said maximum sequence likelihood estimator.

5. The maximum likelihood sequence estimation receiver defined in claim 1, wherein said transmission line distortion is a distortion due to frequency selective fading in multipath wave propagation over a radio line.

6. A maximum likelihood sequence estimation receiver applicable for a high-speed digital communications system, wherein said maximum likelihood sequence estimation receiver that selects an optimum region among impulse response sequences with transmission line distortion to estimate a transmission signal among signals with transmission distortion, comprising:

decision means for substitutively implementing a power calculation within an estimation region by an absolute value operation and detecting a timing at which a cumulative value of absolute values in said estimation region is maximized and thus deciding an optimum estimation region with a small amount of processes.

7. The maximum likelihood sequence estimation receiver defined in claim 6, wherein said decision means comprises:

a transmission line characteristic detector for detecting a transmission line characteristic in a received signal;

an absolute value arithmetic section for performing arithmetic on absolute values of amplitude components in the transmission line characteristic detected by said transmission line characteristic detector;

an accumulator for accumulating the absolute values of said amplitude components from said absolute value arithmetic section and then outputting an output signal;

a maximum value detector for detecting a timing at which the output signal of said accumulator indicates a maximum value; and a maximum likelihood sequence estimator for performing a maximum likelihood estimation of the received signal using the transmission line characteristic from said transmission line characteristic detector and the timing from said maximum value detector.

8. The maximum likelihood sequence estimation receiver defined in claim 7, wherein said absolute value arithmetic section comprises:

a first absolute value arithmetic section for determining a real part absolute value of a complex signal with a transmission characteristic;

a second absolute value arithmetic section for determining an imaginary part absolute value of the complex signal with a transmission characteristic;

a comparator for comparing the real part absolute value from said first absolute value arithmetic section with the imaginary part absolute value from said second absolute value arithmetic section and then outputting a comparison signal;

a switching section for outputting said real part absolute value and the imaginary part absolute value without any change when said real part absolute value is larger than said imaginary part absolute value and reversely outputting said real part absolute value and the imaginary part absolute value when said real part absolute value is smaller than said imaginary part absolute value;

a multiplier for outputting said imaginary part absolute value when said real part absolute value from said switching section is larger than said imaginary part absolute value from said switching section or decreasing said real part absolute value switched by said switching section when said real part absolute value from said switching section is smaller than said imaginary part absolute value from said switching section; and an adder for adding an output signal from said switching section and an output signal from said multiplier and then outputting a resultant signal as an absolute value signal.

9. The maximum likelihood sequence estimation receiver defined in claim 7, wherein said maximum value detector comprises:

a first register for storing a maximum value among values of output signals from said accumulator;

a comparator for comparing an input signal sent from said accumulator with an output signal from said first register;

a switching section for receiving an input signal from said accumulator and an output signal from said first register, selectively outputting the input signal as a maximum value when the output signal from said comparator is larger than the input signal, and selecting the output signal from said first register when the input signal is smaller than the output signal from said first register;

a counter for outputting a count value; and a second register for storing an output signal from said comparator, a count value of said counter, and a timing value and then outputting the values to said maximum likelihood sequence estimator.

10. The maximum likelihood sequence estimation receiver defined in claim 6, wherein said transmission line distortion is a distortion due to frequency selective fading in multiple radio wave propagation over a radio line.

11. The maximum likelihood sequence estimation receiver defined in claim 6, wherein said high-speed digital communications system is a digital mobile telephone system.

12. A method of receiving maximum-likelihood sequence estimates, comprising the steps of:

substitutively implementing a power calculation within estimation region by an absolute value operation;

detecting a timing at which a cumulative value of absolute values in said estimation region is maximized; and deciding an optimum estimation region with a small amount of processes;

wherein a transmission signal among signals with transmission distortion is estimated by selecting an optimum region among impulse response sequences with transmission distortion.

* * * * *